Patented July 6, 1948

2,444,654

UNITED STATES PATENT OFFICE 2,444,654

NICKEL ELECTRODE FOR WELDING CAST IRON

Theodore Ephraim Kihlgren, Scotch Plains, N. J., assignor to The International Nickel Company, Inc., New York, N. Y., a corporation of Delaware No Drawing. Application March 15, 1946, Serial No. 654,809

5 Claims. (Cl. 219—8)

The present invention relates to an arc welding electrode and, more particularly, to an arc welding electrode which will produce sound, machinable metallic weld deposits on cast iron and particularly gray cast iron using either D. C. or A. C. welding machines.

When prior art welding electrodes were used for producing weld deposits on gray cast iron, numerous disadvantages were encountered. Generally such weld deposits had strong hot cracking tendencies. Some had erratic arc characteristics while others tended to "pile up" weld metal rather than to "wash" the deposited metal against the sides of the cavity or joint while still others exhibited poor slag coverage or slag removal characteristics.

I have invented a nickel arc welding electrode which overcomes the defects and deficiencies found in prior art weld deposits on cast iron.

It is an object of the present invention to provide a welding electrode capable of use in either A. C. or D. C. welding machines.

Another object of the present invention is the provision of a welding electrode capable of producing sound machinable weld deposits on cast iron.

Another object of the present invention is the production of weld deposits on iron castings with or without preheating of the casting.

A still further object of the present invention is the provision of a smooth contour weld deposit resulting from superior "wash" characteristics of the electrode.

A still further object of the present invention is the production of a weld deposit on cast iron having sufficient graphitic carbon therein to impart low shrinkage solidification with consequent lower stresses as well as imparting enhanced machinability.

The present invention also contemplates the provision of a flux coated welding electrode having a well adjusted burn-off rate.

According to the present invention, a delicate balance of the constituents of the flux coating in relation to the core wire is obtained to produce an arc welding electrode characterized by good arc behavior and slag characteristics producing good weld contour and a high quality deposit.

Stated broadly, the electrode of the present invention comprises a core wire of nickel and a flux coating on said core wire of special characteristics.

The core wire for the electrode of the present invention is preferably a wire containing from about 98.5% nickel to about 99.5% nickel with the balance consisting of minor proportions of deoxidizers and impurities such as carbon, manganese, iron, silicon, copper, titanium and magnesium.

The flux coating comprises slag-forming ingredients such as carbonates and fluorides of alkaline earth metals, preferably calcium; titanium, preferably in the form of a ferro-titanium alloy; carbon, at least a portion of which is preferably in the form of natural graphite; iron, in the form of iron powder; and a colloidal clay binder, preferably bentonite.

Generally speaking, the dry ingredients for the flux are as given in the following preferred and general ranges:

*Flux coating*

| Dry Ingredients | Preferred | Range |
| --- | --- | --- |
| | Parts | Parts |
| Calcium carbonate | 32 | 25–50 |
| Calcium fluoride | 29 | 20–35 |
| Iron powder | 15 | 0–30 |
| Carbon | 15 | 10–30 |
| Ferro-25 titanium | 5 | 1–10 |
| Bentonite | 4 | 3–6 |

As a binder for the foregoing dry ingredients, compositions within the following range may be used:

| Binder | Preferred | Range |
| --- | --- | --- |
| | Parts | Parts |
| A. {Dextrine | 5 | 0.5–6 |
| {Water | 12 | 10–15 |
| B. Sodium Silicate | 4 | 0–5 |

The water and dextrine (A) are mixed at 180° to 200° F. for about 15 minutes. The sodium silicate (B) is added to the (A) mixture just before adding the resultant mixture to the dry ingredients.

Variation may be made in the foregoing dry ingredients and binder ingredients without departing from the spirit and scope of the present invention. For example, iron powder is preferably included for its beneficial effects on electrode "burn-off" characteristics but is not an essential ingredient in obtaining the beneficial results of the present invention. The primary purpose for adding sodium silicate in the binder solution is to inhibit reaction between the dextrine binder and the iron powder. Thus, when iron powder is eliminated as a dry flux ingredient, the sodium silicate may also be eliminated. The substitution of sodium carbonate or other alkaline salts in suitable quantities for the sodium silicate will produce similar inhibiting results. The carbon used may be added entirely as manufactured carbon of about 200 mesh size but I prefer that about 5% of all the carbon be added in the form of natural graphite which improves the extrudability of the flux. When the ferro-titanium is added in other form than the ferro-25 titanium alloy, for example as ferro-40 titanium, the amount added is proportionately reduced to maintain the titanium addition within the range given.

The flux is applied to the core wire by the extrusion process, the coating being applied in a thickness sufficient to accomplish the desired result. For example, the following core diameter-flux thickness relationships are typical:

| Core Diameter | Electrode O. D. | Flux Thickness |
| --- | --- | --- |
| Inches | Inches | Inches |
| .125 | .180 | .0275 |
| .156 | .210 | .027 |
| .187 | .240 | .0265 |

The thickness of the flux coating may vary considerably however. For example, the .156" diameter core, coated to an outside diameter of .230", has been used successfully in many instances.

The carbon introduced into the fusion through the coating has an important metallurgical effect upon the deposit. The carbon absorbed by the molten weld metal is rejected as graphitic carbon in a way to reduce shrinkage stresses and decrease weld cracking tendencies. An accompanying effect is the break in continuity of the nickel matrix resulting in greatly improved machinability. Weld deposits made with the electrode of the present invention customarily show a content of 0.90% to 1.30% graphitic carbon on analysis. The weld structure is then essentially a nickel (austenitic) matrix with graphitic carbon.

Test pad welds about 1½" x 2½" x ½" thick were deposited at low current inputs. Pad welds consist of all weld metal deposits in which the possibility of plate dilution is eliminated. These pad welds were made using one electrode of the present invention and one electrode each of competitive electrodes recommended for cast iron welding, and the weld deposits were analyzed for their content of nickel, copper, total carbon and graphitic carbon. These results are given in Table 1.

Table 1

| Element | P. I. | C-1 | C-2 |
| --- | --- | --- | --- |
| Nickel | 91.7 | 95.1 | 68.64 |
| Copper | 0.05 | 0.24 | 28.97 |
| Total carbon | 1.38 | 0.53 | 0.17 |
| Graphitic carbon | 1.13 | 0.33 | 0.008 |

The rod identified as P. I. in the foregoing table is the electrode of the present invention while rods identified as C-1 and C-2 are competitive rods 1 and 2, respectively.

Test welds were made using the electrodes reported in Table 1. The test weld was made by making a weld deposit in a groove in the surface of a piece of cast iron. The groove was semicircular in cross-section and was made lengthwise in a piece of cast iron 5" x 4" x 1" thick. The groove was about ½" in depth. All deposits were made with 600° F. of preheat for the cast iron and no peening. The weld using the P. I. rod showed no cracks in the beads during welding while welds made with the rods C-1 and C-2 showed severe cracks. Each of the welds was sectioned and the deposit with the P. I. rod showed no cracks while the deposits made with rods C-1 and C-2 showed severe cracks.

Another series of test welds were made using rods P. I., C-1 and C-2. These tests consisted of a V-butt weld with each rod using two pieces of ½" x 3" x 6" cast iron, the V-butt weld being made along the 6" side, with no preheat and no peening. Severe cracking was observed in the weld deposits made with electrodes C-1 and C-2 both during welding and in the sectioned deposits. The weld deposit made with the P. I. electrode was devoid of cracks both during welding and in the sections.

Although the present invention has been described in connection with certain specific embodiments, it is to be understood that variations and modifications in composition and proportions of ingredients may be made without departing from the spirit and scope of the invention as set forth in the appended claims.

I claim:

1. An arc welding electrode for welding cast iron consisting of a core wire containing between 98.5% and 99.5% nickel and a flux coating enclosing said core wire, said flux coating containing about 10 parts to 30 parts carbon, about .25 part to 2.5 parts titanium in the form of an alloy, iron powder ranging up to 30 parts, from 45 parts to 85 parts slag-forming materials and a binder.

2. An arc welding electrode for welding cast iron consisting of a core wire containing between 98.5% and 99.5% nickel and a flux coating enclosing said core wire, said flux coating containing about 10 parts to 30 parts carbon, at least a portion of which is present in the form of natural graphite, about 1.25 parts titanium in the form of a ferro-titanium alloy, an amount of iron powder ranging up to about 30 parts, from about 45 parts to about 85 parts slag-forming materials and a dextrine binder.

3. An arc welding electrode for making machineable welds on cast iron consisting of a core wire containing between 98.5% and 99.5% nickel and a flux coating enclosing said core wire, said flux coating containing about 15 parts carbon, about 5 parts ferro-25 titanium, about 15 parts iron powder, about 32 parts calcium carbonate, about 29 parts calcium fluoride, about 4 parts bentonite and a dextrine-water-sodium silicate binder in proportions adapted to impart extrudability to said flux coating.

4. An arc welding electrode for making machinable weld deposits on cast iron consisting of a core wire containing between 98.5% and 99.5% nickel and a flux coating enclosing said core wire, said flux coating containing about 25 to 50 parts calcium carbonate, about 25 to 35 parts calcium fluoride, from a trace to about 30 parts iron powder, about 10 to 30 parts carbon, about 1 to 10 parts ferro-25 titanium, about 3 to 6 parts bentonite and a dextrine-water binder in proportions adapted to impart extrudability to said flux coating.

5. An arc welding electrode for making machinable weld deposits on cast iron consisting of a core wire containing between 98.5% and 99.5% nickel and a flux coating enclosing said core wire, said flux coating containing about 45 to 85 parts of slag-forming materials, up to about 30 parts iron powder, about 10 to 30 parts carbon, about 0.25 to 2.5 parts titanium in the form of an alloy, about 3 to 6 parts bentonite and a dextrine-water binder in proportions adapted to impart extrudability to said flux coating.

THEODORE EPHRAIM KIHLGREN.

REFERENCES CITED

The following references are of record in the file of this patent:

UNITED STATES PATENTS

| Number | Name | Date |
| --- | --- | --- |
| 2,303,746 | Kihlgren et al. | Dec. 1, 1942 |